March 10, 1959  G. A. TOMIK  2,877,055
WHEELS FOR VEHICLES

Filed Aug. 8, 1955  2 Sheets-Sheet 1

INVENTOR
GEORGE ALOIS TOMIK
ATTORNEY

March 10, 1959     G. A. TOMIK     2,877,055
WHEELS FOR VEHICLES

Filed Aug. 8, 1955     2 Sheets-Sheet 2

INVENTOR
GEORGE ALOIS TOMIK
Paul O. Pippel
ATTORNEY

United States Patent Office 2,877,055
Patented Mar. 10, 1959

2,877,055

WHEELS FOR VEHICLES

George Alois Tomik, Doncaster, England, assignor to International Harvester Company, a corporation of New Jersey Application August 8, 1955, Serial No. 527,059

Claims priority, application Great Britain September 1, 1954

7 Claims. (Cl. 301—9)

This invention relates to wheels for vehicles, and is particularly concerned with an improved construction of variable track wheel for a vehicle such as a tractor.

In vehicles such as tractors, especially when used for agricultural purposes, it is often desirable to vary the track or width apart of the driving wheels so as to conform to the spacing of plant rows, furrows or the like.

Various proposals for varying the track of wheels have been made. For instance, in some cases the wheel is axially displaceable as a whole with respect to its axle and fixed in an adjusted position by set-screws or the like. In another proposal, the wheel is shaped with its rim axially displaced in relation to its hub so that by reversing the wheel on its axle a different width of track may be obtained.

It has also been proposed to provide a variable track wheel in which the body of the wheel is formed at its periphery with circumferentially extending sets of projections, said sets of projections being displaced with respect to one another axially of the wheel, and a separate rim is provided with inwardly projecting lugs whereby it may be secured to a selected set of projections on the body of the wheel by means of bolts and nuts.

The first two proposals involve manipulation or lifting of the whole wheel assembly which is usually of considerable weight, while in the latter proposal the rim and tire assembly, which particularly if the tire is filled with liquid ballast may be very cumbersome, has to be detached from the wheel and the weight thereof supported while it is positioned for attachment to another set of the projections on the wheel.

The present invention has for its object to provide an improved construction of variable track wheel whereby adjustments of track width may be effected by varying the position of a rim with respect to the body of the wheel while maintaining the rim supported by the wheel during the adjusting procedure.

According to the present invention, a variable track wheel for a vehicle, such as a tractor, comprises at least two sets of circumferentially arranged mounting pads for a separate rim carrying a tire, said sets of pads being offset with respect to one another axially and circumferentially of the wheel and said rim being slidable axially of the wheel on said pads to be supported by a selected set of pads, and clamping means associated with said selected set of pads for positioning the rim in relation thereto. The clamping means may comprise opposed rim-engaging members interchangeable from one side of the wheel to the other and of different effective length axially of the wheel, and screw means, such as a bolt, for drawing said clamping members together to locate the rim in one or other of two axially displaced positions on a selected set of pads. The screw means may comprise a bolt having an extended threaded portion to receive inner and outer nuts, the inner nut engaging a face on the outer side of the wheel to clamp one rim-engaging member rigidly at the inner side of the wheel, and the other nut acting on the other rim-engaging member at the outer side of the wheel for drawing the said members together to engage the rim. The rim-engaging member of shorter effective length may be reversible and may be shaped so that when used at the inner side of the wheel a flat face thereof abuts a corresponding flat seating face associated with the respective pad, while when used at the outer side of the wheel in the reverse position, a recessed part of the said member accommodates said inner nut. The rim-engaging member of greater effective length may be provided at its inner side with a flanged abutment adapted to abut a flat seating face at the inner side of the respective pad and, when used at the outerside of the wheel in the reverse position, to provide a recess for accommodating said inner nut.

Keyways may be arranged to extend across the periphery of the wheel intermediate at least two adjacent pads for coacting with keying means (not shown) for transmitting drive from the body of the wheel to the rim.

The invention is hereinafter described, by way of example, with reference to the accompanying diagrammatic drawings, in which.

Figure 1:
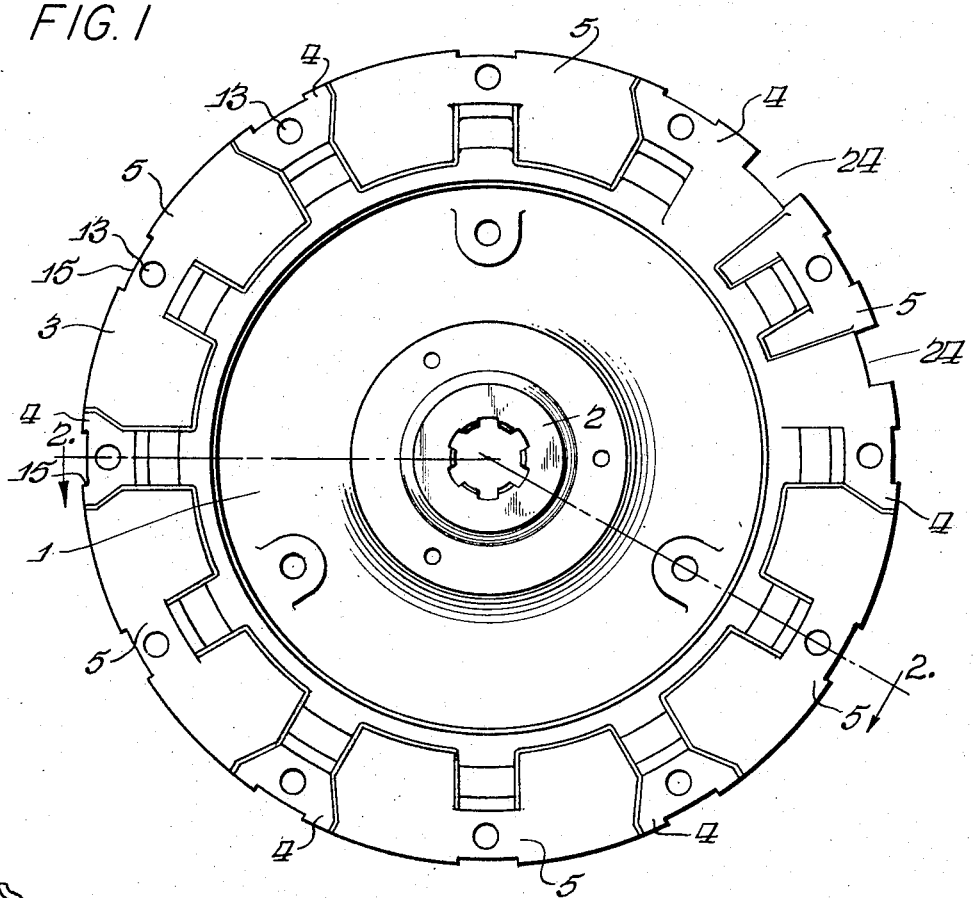
Fig. 1 is a view in side elevation showing the outer side of the body of a rear or driving wheel of a tractor provided with two sets of rim-mounting pads in accordance with the invention.

In carrying the invention into effect according to one embodiment, and with reference to the accompanying diagrammatic drawings, a wheel body 1 having a hub portion 2 suitably splined for mounting on a driving axle comprises a radial body portion or felly portion 3 formed with two sets of rim-mounting pads 4 and 5 respectively. As shown, each set of pads may comprise six pads symmetrically arranged around the circumference of the wheel. As will be seen in Fig. 2, the pads 4 are displaced towards the outer side of the wheel with respect to the pads 5 but overlap the same so that a rim 6 carrying a tire (not shown) may, while supported on said pads, be shifted axially from one set of pads to the other, i. e., from the pads 4 (Figs. 2 and 3) to the pads 5 (Figs. 4 and 5), or vice versa. The rim 6 is positioned in relation to the selected set of pads by clamping means associated with said pads, the clamping means associated with each pad comprising rim-engaging members 7, 8 of different effective length axially of the wheel, and a clamping bolt 9 having an extended screw-threaded portion 10 receiving inner and outer nuts 11, 12 respectively, the bolt 9 extending through a hole 13 in the respective pad. The member 7 of greater effective length is L-shaped, as shown, and the rim-engaging part 14 is adapted to be located in a recess 15 extending across the pad parallel to the axis of the wheel. The radially extending part of the member 7 has at its inner side a flanged part 16 forming an abutment when the member 7 is in the position shown in Figs. 2 and 4 and providing a recess for the accommodation of the inner nut 11 when the member 7 is in the position shown in Figs. 3 and 5. The rim-engaging member 8 of shorter effective length has rim-engaging portions 17, 18 on opposite sides so that it is reversible, the member 8 being shaped so that when applied at the inner side of the wheel, as in Figs. 3 and 5, a flat face 19 of the member 8 abuts against a corresponding flat face 20 of the respective pad, while when reversed to the position shown in Figs. 2 and 4, a part 21 coacts with a shoulder 22 and a recess 23 accommodates the inner nut 11.

Figure 2:
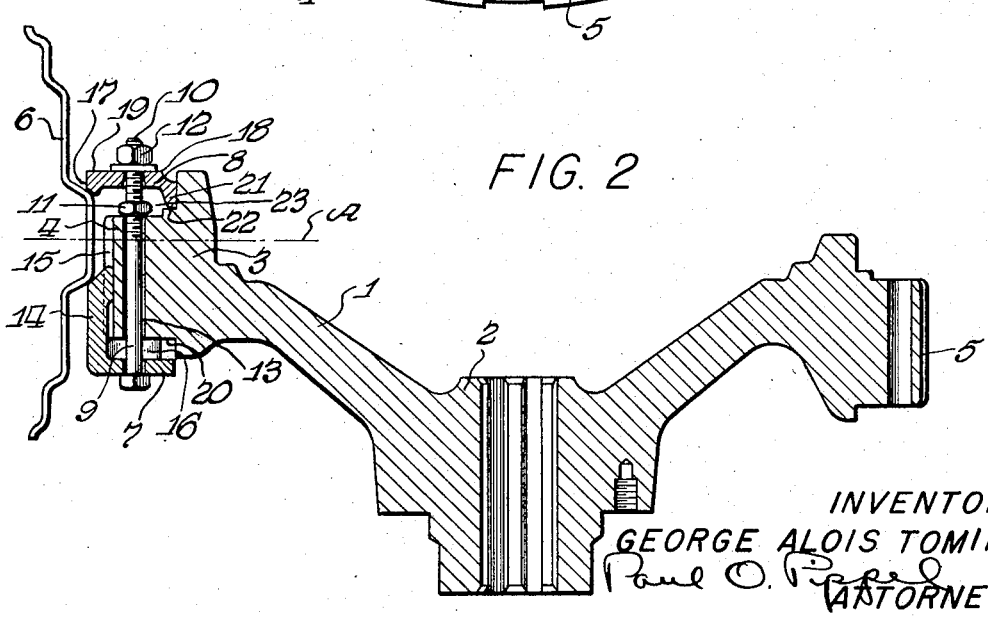
Fig. 2 is a section on the line II—II, Fig. 1, showing a rim positioned on one set of pads by clamping means including reversible rim-engaging members.
Figure 3:
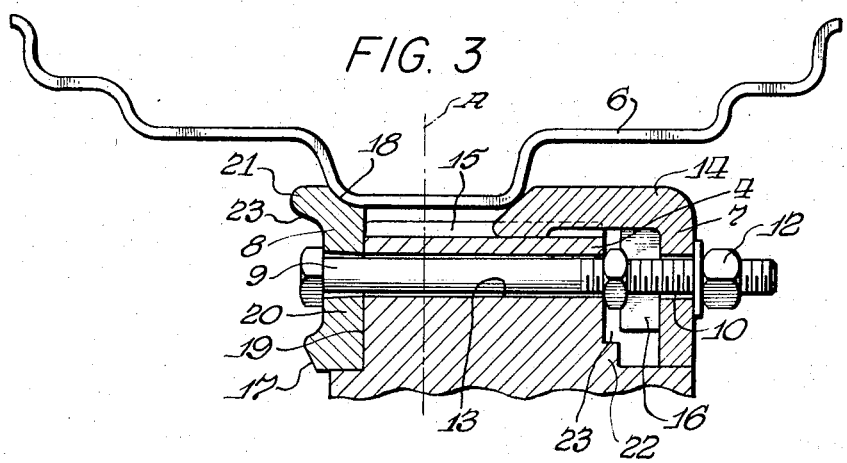
Fig. 3 is a detail section showing the rim-engaging members reversed so as to position the rim further towards the inner side of the wheel on the same set of pads.
Figure 4:
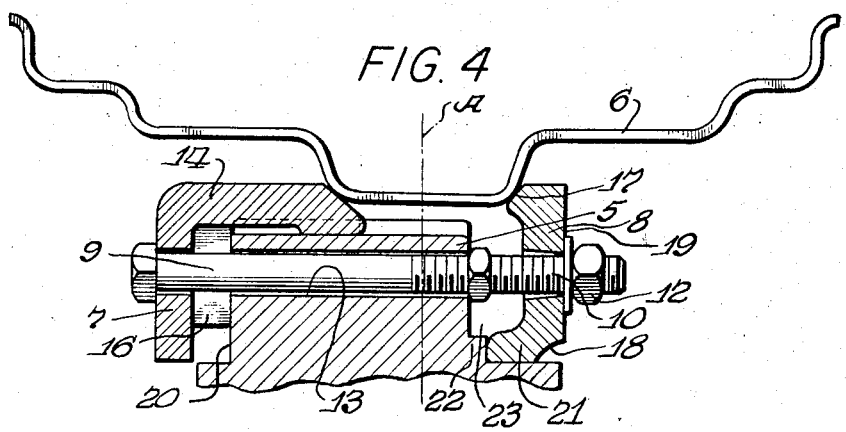
Fig. 4 is a similar view showing the rim mounted on the other set of pads but with the rim-engaging members disposed as in Fig. 2 so that the centre line of the rim is in the same position as in Fig. 3.
Figure 5:
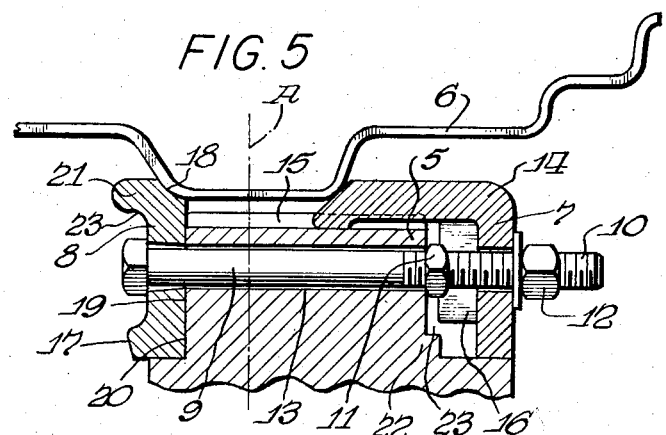
Fig. 5 is a view showing the rim-engaging members in the arrangement of Fig. 4 reversed so that the rim is disposed further towards the inner side of the wheel.

The inner nut 11 engages against the outer face of the respective pad so that the inner rim-engaging member, i. e. the member 7 in Figs. 2 and 4, or the member 8 in Figs. 3 and 5, is held tightly against the inner radial side of the pad for positioning the rim 6 in definite location with respect to the selected set of pads. The outer nut 12 serves to draw the other rim-engaging member into engagement with the rim for clamping the rim securely between the rim-engaging members 7, 8.

Keyways 24 may be arranged to extend across the periphery of the wheel intermediate at least two adjacent pads for coacting with keying means (not shown) for transmitting drive from the body 1 of the wheel to the rim 6.

It will be seen that although in Fig. 3 the rim 6 is positioned from the pads 4, and in Fig. 4 from the pads 5, the centre line A of the rim remains in the same position relative to the wheel due to the reversed positions of the rim-engaging members 7 and 8. Thus, with two sets of pads 4 and 5 and rim-engaging members 7 and 8 interchangeable from one side of the wheel to the other, three different track widths are obtainable. Fig. 2 shows the rim positioned for maximum track width and Fig. 5 for minimum track width. If it is required to change from either maximum or minimum track width to the intermediate track width shown in Figs. 3 and 4, it is only necessary to change the rim-engaging members 7, 8 from one side to the other accompanied by shifting movement of the rim 6 on the one set of pads. In changing from the maximum to the minimum track width, however, the rim is shifted from one set of pads to the other and the rim-engaging members 7, 8 also are interchanged, for example, from the position shown in Fig. 2 to the position shown in Fig. 5.

It will be readily appreciated that all adjustments of track width can be affected while the rim 6 carrying the tire is supported on the pads so as to be capable of being slid axially to the required position on one set of pads or the other, final positioning of the rim in relation to the selected set of pads being obtained when the rim-engaging members 7, 8 are applied and the nuts 11 and 12 tightened up.

It will be understood that the invention is not limited to the particular embodiment hereinbefore described. For example, if required, more than two axially displaced sets of pads may be employed, and where small variations in track width are not required, the rim-engaging members need not be interchangeable from one side of the wheel to the other in the manner described.

What I claim is:

1. A device in the class described, a vehicular wheel having axially opposed sides, a tire carrying rim having an unobstructed inner peripheral surface about said wheel, a plurality of sets of mounting pads located at the outer periphery of the wheel, said sets of mounting pads being offset from one another circumferentially of the wheel and presenting radial clamp-positioning surfaces, the surfaces of each set on at least one side of the wheel being offset axially with respect to the surfaces on the other of said sets, clamping means detachably associable with the rim and alternatively associable with the respective of said sets of pads in engagement with said surfaces thereon for axially positioning the unobstructed inner peripheral surface of the rim with respect to the outer periphery of the wheel by shifting the rim with its inner peripheral surface axially only over the pads.

2. The invention according to claim 1 and further characterized in that the clamping means comprises opposed rim-engaging members interchangeable from one side of the wheel to the other and of different effective length axially of the wheel, and screw means for fastening the rim-engaging members about the pads and the rim, comprising, a bolt having an extended threaded portion, an inner nut receivable in a threaded portion of said bolt and engaging a face on the outer side of the wheel to clamp one rim-engaging member rigidly at the inner side of the wheel, and a second nut receivable in the threaded portion of said bolt and acting on the other rim-engaging member at the outer side of the wheel for drawing the said members together to engage the rim.

3. The invention according to claim 1 and further characterized in that keyways are arranged to extend across the periphery of the wheel intermediate at least two adjacent pads for coacting with keying means for transmitting drive from the body of the wheel to the rim.

4. In a wheel comprising a hub, a radial body portion having outer substantially concentric axially extending surfaces, first and second sets of pads offset axially and circumferentially with respect to each other, a rim about said body portion surface and slidably axially thereof, and detachable clamps embracing the rim and connected to said first set of pads for positioning said rim in a first position, said clamps adapted to be mounted on said second set of pads for positioning said rim in a second position axially offset from said first position by drawing the rim axially only from one position to the other in accordance with the disposition of the clamps on the first or second sets of pads.

5. The invention according to claim 4 and further characterized in that said clamps each comprise a pair of axially opposed elements disposed at opposite sides of the wheel in embracing relation to a selected pad and one element of each pair having a greater axial length than the other and in one position of the rim disposed at one side of the wheel and in another position of the rim disposed at the opposite side of the wheel.

6. In a device of the class described, means to vary the position of the rim with respect to the body of the wheel to obtain different track widths while maintaining the rim supported by the wheel during the adjusting procedure comprising, a vehicular wheel having a hub and felly portion, said felly portion having an outer periphery, a tire carrying rim about said wheel and having an inner peripheral surface spaced outwardly of said outer periphery, two sets of mounting pads about the outer periphery of the felly portion of the wheel, one set of mounting pads being offset from the other axially and circumferentially of the wheel, said rim having radial clamping surfaces entirely outwardly of the pads, clamping means for positioning the rim with respect to either set of pads, said clamping means having opposed clamping-surface-engaging members of different effective lengths and being interchangeable from one side of the wheel to the other, said clamping-surface-engaging members co-acting with either set of pads to provide a variable tread width and having means for drawing up the same against respective pads and coincidently shifting the rim axially through engagement with said radial surfaces.

7. In a device of the class described, means to vary the position of the rim with respect to the body of the wheel to obtain different track widths while maintaining the rim supported by the wheel during the adjusting procedure comprising, a vehicular wheel having a hub and felly portion, a tire carrying rim about said wheel, two sets of mounting pads about the outer periphery of the felly portion of the wheel offset from one another axially and circumferentially of the wheel and having an inner radial side, presenting a flat seating face, clamping means for positioning the rim with respect to either set of pads, said clamping means having opposed rim-engaging members of different effective lengths and being interchangeable from one side of the wheel to the other, said rim-engaging members co-acting with either set of pads to provide a variable tread width, the rim-engaging member of greater effective length being provided at its inner side with a flanged abutment adapted to abut a flat seating face at the inner radial side of a respective pad, and, when used at the outer side of the wheel in the reverse position, to be spaced axially outwardly of the related pad, wherein the rim-engaging member of shorter effective length is reversible and is shaped so that when used at the inner side of the wheel a flat face thereof abuts a corresponding flat seating face at the inner radial side of a respective pad, while when used at the outer side of the wheel in the reverse position, is spaced axially outwardly of the related pad.

References Cited in the file of this patent

UNITED STATES PATENTS

| | | |
|---|---|---|
| 1,864,701 | Walther | June 28, 1932 |
| 2,173,195 | Beckman | Sept. 19, 1939 |
| 2,228,488 | Rietz | Jan. 14, 1941 |
| 2,458,249 | Bunting | Jan. 4, 1949 |
| 2,495,952 | Allman | Jan. 31, 1950 |

FOREIGN PATENTS

| | | |
|---|---|---|
| 509,452 | Great Britain | July 17, 1939 |